United States Patent
Guo

(10) Patent No.: US 9,015,841 B2
(45) Date of Patent: Apr. 21, 2015

(54) METHOD AND APPARATUS FOR VIRUS SCANNING

(71) Applicant: Tencent Technology (Shenzhen) Company Limited, Shenzhen City, Guangdong (CN)

(72) Inventor: Xi Guo, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 14/082,972

(22) Filed: Nov. 18, 2013

(65) Prior Publication Data

US 2014/0090062 A1    Mar. 27, 2014

Related U.S. Application Data

(63) Continuation of application No. PCT/CN2013/082059, filed on Aug. 22, 2013.

(30) Foreign Application Priority Data

Sep. 20, 2012  (CN) .......................... 2012 1 0351773

(51) Int. Cl.
  *G06F 21/00* (2013.01)
  *G06F 21/56* (2013.01)
(52) U.S. Cl.
  CPC .................................. *G06F 21/566* (2013.01)
(58) Field of Classification Search
  USPC ........................................................ 726/24
  See application file for complete search history.

(56) References Cited

U.S. PATENT DOCUMENTS

| 5,502,815 | A | 3/1996 | Cozza |
| 7,472,422 | B1 | 12/2008 | Agbabian |
| 2006/0190938 | A1* | 8/2006 | Capek et al. ................... 717/161 |
| 2011/0239302 | A1* | 9/2011 | Choi .............................. 726/24 |
| 2013/0332934 | A1* | 12/2013 | Hood et al. .................... 718/102 |

FOREIGN PATENT DOCUMENTS

WO    2012/121713 A1    9/2012

OTHER PUBLICATIONS

State Intellectual Property Office of the People's Republic of China (ISR/CN), "International Search Report for PCT/CN2013/082059", China, Nov. 28, 2013.

* cited by examiner

*Primary Examiner* — Yogesh Paliwal
(74) *Attorney, Agent, or Firm* — Tim Tingkang Xia, Esq.; Morris, Manning & Martin, LLP

(57) ABSTRACT

Method and apparatus for virus scanning, and a non-transitory computer-readable medium that stores instructions for performing virus scanning. The method includes detecting a status of a system; and when the status of the system is idle, if current virus scanning has begun, continuing the current virus scanning, and if the current virus scanning has not begun, acquiring a scanning progress of previous virus scanning, beginning the current virus scanning according to the acquired scanning progress, and recording a scanning progress of the current virus scanning.

21 Claims, 4 Drawing Sheets

METHOD AND APPARATUS FOR VIRUS SCANNING

CROSS-REFERENCE TO RELATED APPLICATION

This application is a continuation application of International Patent Application No. PCT/CN2013/082059, filed Aug. 22, 2013, which itself claims the priority to Chinese Patent Application No. 201210351773.5, filed Sep. 20, 2012 in the State Intellectual Property Office of P.R. China, which are hereby incorporated herein in their entireties by reference.

FIELD OF THE INVENTION

The present invention relates to the field of computers, and more particularly to method and apparatus for virus scanning, and a non-transitory computer-readable medium that stores instructions to perform virus scanning

BACKGROUND OF THE INVENTION

A computer virus refers to a set of instructions or program codes inserted into a computer program, which damages functions and/or data of computers, affects the use of computers, and is capable of self-replication. The computer virus is of parasitic, infectious, hidden, destructive, diversified, and so on, and causes great damages and destructions to the resources of computers.

In order to effectively detect a virus, conventionally, a virus scanning and killing method requires re-traversal of the entire hard disk and scanning each file in the hard disk at each time of virus scanning. If the user interrupts the current virus scanning, the re-traversal of virus scanning for the entire hard disk is required once again in the next virus scanning.

Therefore, a heretofore unaddressed need exists in the art to address the aforementioned deficiencies and inadequacies.

SUMMARY OF THE INVENTION

One of objectives of the present invention is to provide method and apparatus for virus scanning, and a non-transitory computer-readable medium that stores instructions to perform virus scanning.

In one aspect of the invention, the method includes detecting a status of a system; and when the status of the system is idle, if current virus scanning has begun, continuing the current virus scanning, and if the current virus scanning does not begin, acquiring a scanning progress of previous virus scanning, beginning the current virus scanning according to the scanning progress, and recording a scanning progress of the current virus scanning.

In one embodiment, the step of detecting the status of the system includes:

detecting whether it is in an input status or a full-screen status, and detecting current occupancy of system resources;

if it is in the input status or the full-screen status, determining that the detected system status is busy;

determining, if it is not in the input status and the full-screen status, when the detected current occupancy of system resources is greater than predetermined occupancy, that the detected system status is busy; and determining, if it is not in the input status and the full-screen status, when the current occupancy of system resources detected within a second predetermined time is less than or equal to the predetermined occupancy, that the detected system status is idle.

Further, before the step of detecting the system status, the method includes:

enumerating all hard disk partitions, and adding the hard disk partitions to a tree structure, in which attributes of each node of the tree structure include: whether it is a file, whether enumeration is finished, and whether scanning is finished; and enumerating all directories or files in each hard disk partition, adding the directories or files in the hard disk partitions as nodes to the tree structure, setting attributes of the nodes where the directories or files are located, and adding the files to a scan queue.

In one embodiment, the step of setting attributes of the nodes where the directories or files are located includes:

when enumerating one directory, if enumeration is finished, setting an attribute of a node where the directory is located as ENUMERATION FINISHED, and if the enumeration is unfinished, setting the attribute of the node where the directory is located as ENUMERATION UNFINISHED;

when scanning files or sub-directories under one directory, if scanning of all files and sub-directories under the directory is finished, setting an attribute of a node where the directory is located as SCANNING FINISHED, and if the scanning of all the files or sub-directories under the directory is unfinished, setting the attribute of the node where the directory is located as SCANNING UNFINISHED; and when scanning one file, if scanning of the file is finished, setting an attribute of a node where the file is located as SCANNING FINISHED, and if the scanning of the file is unfinished, setting the attribute of the node where the file is located as SCANNING UNFINISHED.

In one embodiment, the step of beginning the current virus scanning according to the scanning progress includes:

performing depth-first traversal on the tree structure, and checking whether a node has not been scanned or enumerated following the node corresponding to the scanning progress in the tree structure;

if a node has not been scanned, determining whether the node is the node where files are located, if yes, adding the node to the scan queue, and otherwise, continuing depth-first traversal of all sub-nodes of the node;

if a node has not been enumerated, enumerating a node where the directory is located, adding files enumerated under the node where the directory is located to the scan queue, adding sub-directories enumerated under the node where the directory is located to the tree structure, then recursively traversing the node where the directory is located, and after enumeration of the node where the directory is located is finished, labeling the node where the directory is located as ENUMERATION FINISHED; and scanning files in the scan queue according to the scanning progress;

in which, after scanning of one file is finished, searching for a node where the file is located in the tree structure, setting an attribute of the node where the file is located as SCANNING FINISHED, and after scanning of all files and sub-directories under one directory is finished, setting an attribute of a node where the directory is located as SCANNING FINISHED.

In one embodiment, the step of recording a scanning progress of the current virus scanning includes:

upon ending of the current virus scanning, according to the tree structure, recording attributes of each directory enumerated or traversed during the current virus scanning and whether the directory has been scanned, recording attributes of each file enumerated or traversed during the current virus scanning and whether the file has been scanned, recording whether the scanned file is a risk file, and when the file is a risk file, recording a risk name and a hash value of the file.

Further, after the step of beginning the current virus scanning according to the scanning progress, the method also includes:

deleting all files and sub-directories under the node where the directory is located labeled as SCANNING FINISHED.

In addition, after the step of detecting a system status, the method further includes:

when the system status is busy, if the current virus scanning does not begin, waiting for the current virus scanning, and if the current virus scanning has begun, reducing the speed of the current virus scanning, and when system statuses detected within a first predetermined time are all busy, stopping the current virus scanning, and recording a scanning progress of the current virus scanning In another aspect of the invention, an apparatus for virus scanning includes a detection module configured to detect a status of a system; and a first scanning module configured to, when the detection module detects that the system status is idle, if current virus scanning has begun, continue the current virus scanning, and if the current virus scanning does not begin, acquire a scanning progress of previous virus scanning, begin the current virus scanning according to the scanning progress, and record a scanning progress of the current virus scanning.

In one embodiment, the detection module includes a detection unit configured to detect whether it is in an input status or a full-screen status, and detect current occupancy of system resources; a first determination unit configured to determine, if the detection unit detects that it is in the input status or the full-screen status, that the detected system status is busy; a second determination unit configured to determine, if the detection unit detects that it is not in the input status and the full-screen status, when the detected current occupancy of system resources is greater than predetermined occupancy, that the detected system status is busy; and a third determination unit configured to determine, if the detection unit detects that it is not in the input status and the full-screen status, when current occupancy of system resources detected within a second predetermined time is less than or equal to the predetermined occupancy, that the detected system status is idle.

Additionally, the apparatus further includes a first enumeration module configured to enumerate all hard disk partitions, and add the hard disk partitions to a tree structure, in which attributes of each node of the tree structure include: whether it is a file, whether enumeration is finished, and whether scanning is finished; and a second enumeration module configured to enumerate all directories or files in each hard disk partition, add the directories or files in the hard disk partitions as nodes to the tree structure, set attributes of the nodes where the directories or files are located, and add the files to a scan queue.

Further, the second enumeration module is configured to, when enumerating one directory, if enumeration is finished, set an attribute of a node where the directory is located as ENUMERATION FINISHED, and if the enumeration is unfinished, set the attribute of the node where the directory is located as ENUMERATION UNFINISHED; when scanning files or sub-directories under one directory, if scanning of all files and sub-directories under the directory is finished, set an attribute of a node where the directory is located as SCANNING FINISHED, and if the scanning of all the files or sub-directories under the directory is unfinished, set the attribute of the node where the directory is located as SCANNING UNFINISHED; and when scanning one file, if scanning of the file is finished, set an attribute of a node where the file is located as SCANNING FINISHED, and if the scanning of the file is unfinished, set the attribute of the node where the file is located as SCANNING UNFINISHED.

In one embodiment, the first scanning module includes:

a traversal unit configured to perform depth-first traversal on the tree structure, and check whether a node has not been scanned or enumerated following the node corresponding to the scanning progress in the tree structure;

a first traversal subunit configured to determine, when the traversal unit detects that a node has not been scanned, whether the node is the node where files are located, if yes, add the node to the scan queue, and otherwise, continue depth-first traversal of all sub-nodes of the node;

a second traversal subunit configured to enumerate, when the traversal unit detects that a node has not been enumerated, a node where the directory is located, add files enumerated under the node where the directory is located to the scan queue, add sub-directories enumerated under the node where the directory is located to the tree structure, then recursively traverse the node where the directory is located, and after enumeration of the node where the directory is located is finished, label the node where the directory is located as ENUMERATION FINISHED; and a scanning unit configured to scan files in the scan queue according to the scanning progress, in which, after scanning of one file is finished, search for a node where the file is located in the tree structure, set an attribute of the node where the file is located as SCANNING FINISHED, and after scanning of all files and sub-directories under one directory is finished, set an attribute of a node where the directory is located as SCANNING FINISHED.

In another embodiment, the first scanning module further includes a recording unit configured to, upon ending of the current virus scanning, according to the tree structure, record attributes of each directory enumerated or traversed during the current virus scanning and whether the directory has been scanned, record attributes of each file enumerated or traversed during the current virus scanning and whether the file has been scanned, record whether the scanned file is a risk file, and when the file is a risk file, record a risk name and a hash value of the file.

In yet another embodiment, the first scanning module also includes a deletion unit configured to delete all files and sub-directories under the node where the directory is located labeled as SCANNING FINISHED.

Further, the apparatus also includes a second scanning module configured to, when the detection module detects that the system status is busy, if the current virus scanning does not begin, wait for the current virus scanning, and if the current virus scanning has begun, reduce the speed of the current virus scanning, and when system statuses detected within a first predetermined time are all busy, stop the current virus scanning, and record a scanning progress of the current virus scanning.

In yet another aspect of the invention, the non-transitory computer-readable medium storing instructions which, when executed by one or more processors, cause the foregoing disclosed apparatus to perform the foregoing disclosed method for performing virus scanning.

The beneficial effects brought about by the technical solutions according to the embodiments of the present invention are as follows: by detecting a status of a system, the scanning speed can be reduced or the scanning can be stopped when the system status is busy, and virus scanning is performed when the system status is idle, so that the occupancy of the system by the virus scanning can be adjusted and the user experience can be improved; and scanning can continue according to a previous scanning progress during the virus scanning, so that unnecessary scanning time can be reduced greatly.

These and other aspects of the present invention will become apparent from the following description of the preferred embodiment taken in conjunction with the following drawings, although variations and modifications therein is affected without departing from the spirit and scope of the novel concepts of the present invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention.

DETAILED DESCRIPTION OF THE INVENTION

Figure 1:
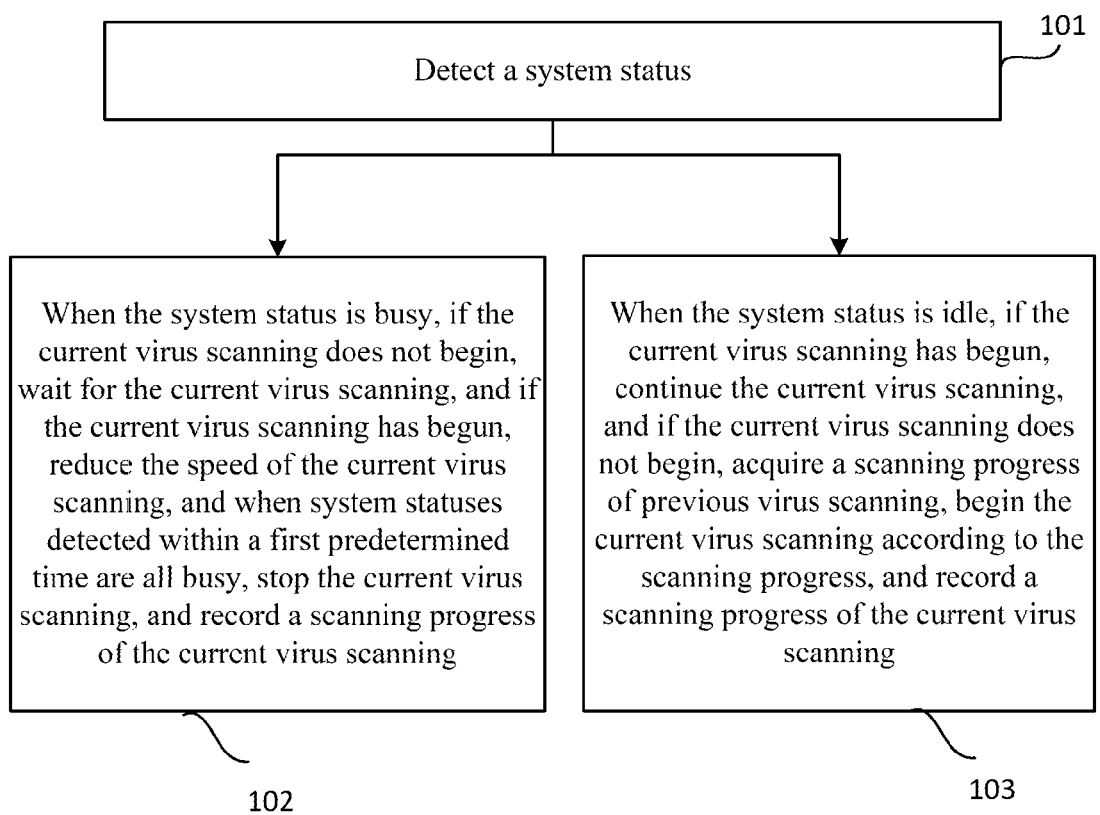
FIG. 1 is a flow chart of a method for virus scanning according to a first embodiment of the present invention.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method is executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules is executed using a single (shared) processor. In addition, some or all code from multiple modules is stored by a single (shared) memory. The term "group", as used herein, means that some or all code from a single module is executed using a group of processors. In addition, some or all code from a single module is stored using a group of memories.

The systems and methods described herein is implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The description will be made as to the embodiments of the present invention in conjunction with the accompanying drawings in FIGS. 1-5. It should be understood that specific embodiments described herein are merely intended to explain the present invention, but not intended to limit the present invention. In accordance with the purposes of this invention, as embodied and broadly described herein, this invention, in one aspect, relates to method and apparatus for virus scanning, and a non-transitory computer-readable medium storing instructions which, when executed by one or more processors, cause the apparatus to perform the method for performing virus scanning

First Embodiment

Referring to FIG. 1, a method for virus scanning is schematically shown according to the first embodiment of the present invention. The method includes the following steps:

Step 101: A status of a system is detected.

The system herein refers to a set of program modules for managing and controlling all hardware and software resources in a terminal (such as a mobile phone or computer); correspondingly, the system status refers to different statuses generated during operation of the program modules in the system.

Generally, the system status can include a busy status and an idle status according to occupancy of system resources during operation of the program modules in the system. For example, when current occupancy of system resources is greater than predetermined occupancy, the system status at this time can be defined as a busy status, and when the current occupancy of system resources is less than the predetermined occupancy, the system status at this time can be defined as an idle status.

Step 102: When the system status is busy, if the current virus scanning does not begin, wait for the current virus scanning, and if current virus scanning has begun, reduce the speed of the current virus scanning, and when system statuses detected within a first predetermined time are all busy, stop the current virus scanning, and record a scanning progress of the current virus scanning Step 103: When the system status is idle, if the current virus scanning has begun, continue the current virus scanning, and if the current virus scanning does not begin, acquire a scanning progress of previous virus scanning, begin the current virus scanning according to the scanning progress, and record a scanning progress of the current virus scanning.

In sum, the method for virus scanning according to the first embodiment of the present invention can adjust a scanning progress according to the system status, and can continue virus scanning from the previous scanning progress, thereby reducing the virus scanning time greatly while improving user experience.

Second Embodiment

Figure 2:
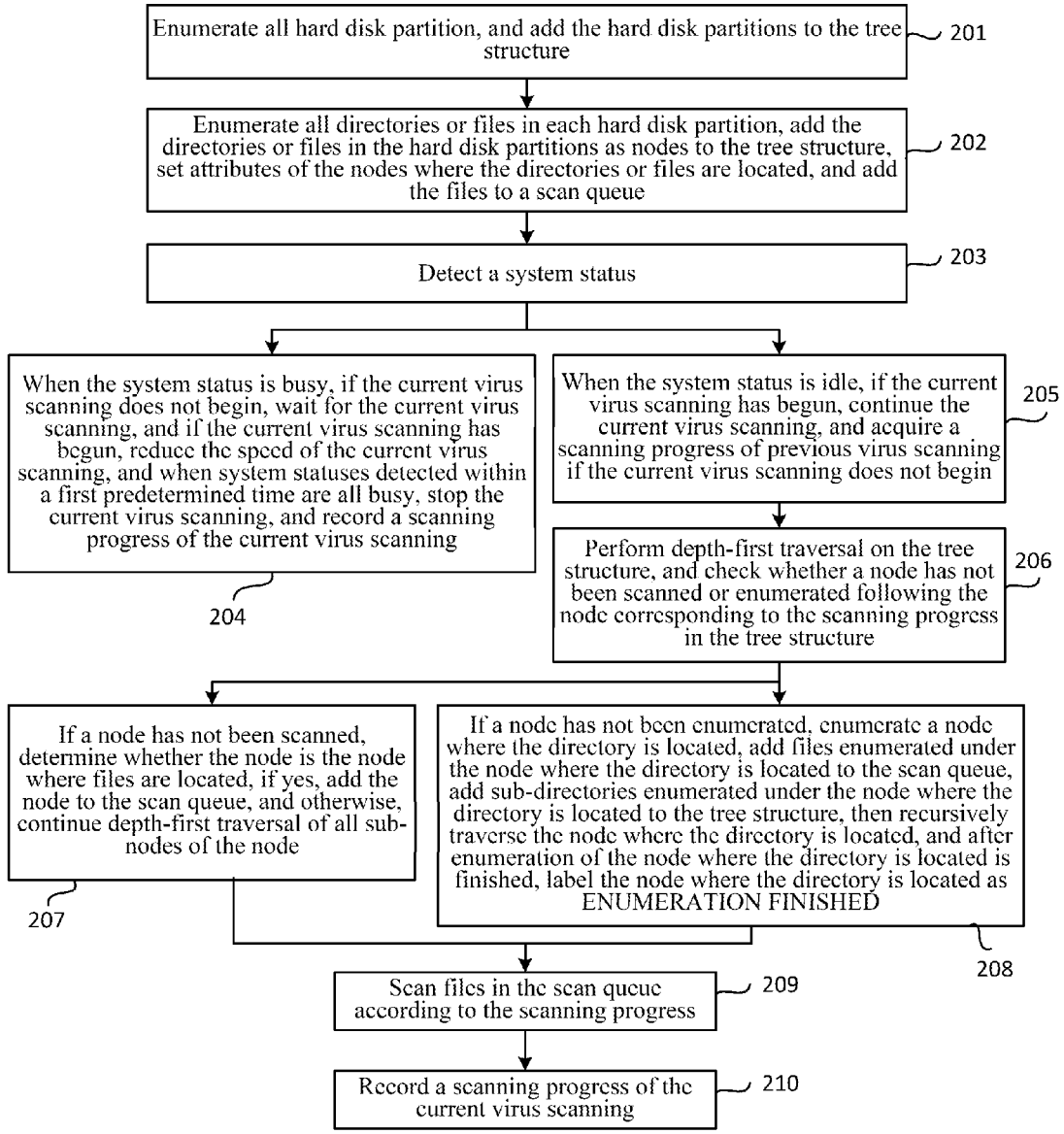
FIG. 2 is a flow chart of a method for virus scanning according to a second embodiment of the present invention.

Referring to FIG. 2, a method for virus scanning is schematically shown according to the second embodiment of the present invention. The method includes the following steps:

Step 201: Enumerate all hard disk partitions, add the hard disk partitions to a tree structure, in which attributes of each node of the tree structure include: whether it is a file, whether enumeration is finished, and whether scanning is finished.

In order to sequentially scan viruses and to ensure continual of virus scanning upon interruption, before virus scanning, it is first necessary to acquire a scan queue, and in order to acquire the scan queue, it is necessary to first enumerate files and directories in partitions. In this embodiment, to reduce the scanning time, virus scanning is performed through enumeration and scanning at the same time during the virus scanning.

This embodiment provides a tree structure to save the scanning progress, and thus, before the virus scanning, it is necessary to first enumerate all hard disk partitions and add the hard disk partitions to the tree structure. In order to facilitate determination of an enumeration progress and a scanning progress, attributes of each node in the tree structure are defined. In order to record a scanning progress and an enumeration progress of each node, the attributes thereof can be defined as: whether it is a file, whether enumeration is finished, and whether scanning is finished.

For example, attributes of a node where the hard disk partitions are located can be defined as: it is not a file, enumeration is unfinished, and scanning is unfinished.

Step 202: Enumerate all directories or files in each hard disk partition, add the directories or files in the hard disk partitions as nodes to the tree structure, set attributes of the nodes where the directories or files are located, and add the files to a scan queue.

Generally, as each partition may contain many directories and files, it is necessary to add the directories and files one by one to sub-nodes under a node corresponding to the partition. For example, Partition A includes File A1 and Directory A2, and Directory A2 includes File A21 and File A22. It is necessary to add File A1 and Directory A2 as two sub-nodes of the node where Partition A is located to the tree structure and add File A21 and File A22 as two sub-nodes of the node where Directory A2 is located to the tree structure.

When directories and files are added to the tree structure as nodes, it is necessary to separately set attributes of the nodes where the directories and files are located. Generally, when one directory is enumerated, if enumeration is finished, the attribute of the node where the directory is located is set as ENUMERATION FINISHED, and if the enumeration is unfinished, the attribute of the node where the directory is located is set as ENUMERATION UNFINISHED. When files or sub-directories under one directory are scanned, if scanning of all files and sub-directories under the directory is finished, an attribute of a node where the directory is located is set as SCANNING FINISHED, and if the scanning of all the files or sub-directories under the directory is unfinished, the attribute of the node where the directory is located is set as SCANNING UNFINISHED. When one file is scanned, if scanning of the file is finished, an attribute of a node where the file is located is set as SCANNING FINISHED, and if the scanning of the file is unfinished, the attribute of the node where the file is located is set as SCANNING UNFINISHED. For example, attributes of nodes where files that have not been scanned are set as: they are files, enumeration is finished, and scanning is unfinished. In another example, attributes of nodes where files that have been scanned are set as: they are files, enumeration is finished, and scanning is finished. In a further example, attributes of nodes where directories for which enumeration is finished but scanning is unfinished are located are set as: they are not files, enumeration is finished, and scanning is unfinished. In a yet another example, attributes of nodes where directories for which enumeration has not yet been finished are set as: they are not files, enumeration is unfinished, and scanning is unfinished. Of course, in actual applications, attributes of each node are set according to whether the node is actually a file, whether enumeration is finished, and whether scanning is finished.

Certainly, in order to perform file scanning, it is necessary to constantly add enumerated files to a scan queue.

In actual applications, if the virus is scanned for the first time or scanning interruption has not occurred before, it is generally necessary to first perform step 201 and step 202 to acquire a scan queue through enumeration, and then the system can perform virus scanning according to the scan queue. In order to decrease the scanning time, this embodiment provides a method of performing enumeration and scanning at the same time. Thus, during the following scanning, it is also necessary to constantly refresh the tree structure according to a scanning progress. Please refer to step 203 to step 211 for the specific scanning process.

Step 203: Detect a system status.

The system herein refers to a set of program modules for managing and controlling all hardware and software resources in a terminal (such as a mobile phone or computer); correspondingly, the system status refers to different statuses generated during operation of the program modules in the system.

Generally, the system status can include a busy status and an idle status according to occupancy of system resources during operation of the program modules in the system. For example, when current occupancy of system resources is greater than predetermined occupancy, the system status at this time can be defined as a busy status, and when the current occupancy of system resources is less than the predetermined occupancy, the system status at this time can be defined as an idle status.

Generally, occupancy of system resources can be determined according to multiple parameters, and the parameters herein may include: CPU use status, memory use status, disk input/output transmission rate, whether the terminal is in the full-screen status, and whether there is user input.

Accordingly, whether the terminal is in the input status or the full-screen status can be detected, and current occupancy of system resources can be detected (for example, CPU use status, memory use status, and disk input/output transmission rate are detected). If the terminal is in the input status or the full-screen status, it is determined that the detected system status is busy. If the terminal is not in the input status and the full-screen status, when the detected current occupancy of system resources (for example, detected occupancy of system resources by the CPU use status, memory use status, and disk input/output transmission rate) is greater than predetermined occupancy, it is determined that the detected system status is busy. If the terminal is not in the input status and the full-screen status, when the current occupancy of system resources detected within a second predetermined time (for example, detected occupancy of system resources by the CPU use status, memory use status, and disk input/output transmission rate) is less than or equal to the predetermined occupancy, it is determined that the detected system status is idle.

Of course, in addition to the parameters, some other determination conditions also can be used to measure occupancy of system resources. For example, current occupancy of system resources can be determined according to different time of the day, and it can be considered that at noon time the user's computer has a high possibility to be idle. The current occupancy of system resources also can be determined by taking statistics of some programs, some large-scale projects, design processes, large games, and the like which occupy more system resources, and when these programs run in the system, it is determined that the system is busy. Of course, when it is detected that the user uses the battery, the scanning is paused to save the use of battery, and when the user uses a 3G network, scanning is not performed, to save the user's data traffic.

Step 204: when the system status is busy, if the current virus scanning does not begin, wait for the current virus scanning, and if the current virus scanning has begun, reduce the speed of the current virus scanning, and when system statuses detected within a first predetermined time are all busy, stop the current virus scanning, and record a scanning progress of the current virus scanning Before the current virus scanning is performed, if it is detected that the system status is busy, it is necessary to continue waiting for the current virus scanning, that is to say, the current virus scanning does not begin at this time.

When the local virus scanning is already in progress, if it is detected that the system status is busy at this time, the speed of the local virus scanning can be reduced, so as to decrease the occupation of the system by the current virus scanning. Then, system statuses are detected continuously, if the system statuses are all busy within a first predetermined time, it indicates that other programs in the system are using the system and high system occupancy is required, and virus scanning can be stopped at this time, so as to avoid affecting user experience.

In the specific implementation, the first predetermined time can be determined according to some factors of the terminal. For example, the first predetermined time can be determined according to factors such as current occupancy of resources in the terminal system and current occupancy of resources by virus scanning.

A virus scanning progress needs to be recorded during each time of virus scanning or after the scanning ends. That is to say, after scanning ends each time, it is necessary to accumulate and save each node in the tree structure at the scanning progress and the status corresponding to the attribute of each node.

Step 205: When the system status is idle, if the current virus scanning has begun, continue the current virus scanning, and acquire a scanning progress of previous virus scanning if the current virus scanning does not begin.

When it is detected that the system status is idle, and if at the same time the current virus scanning is being performed, continue the current virus scanning When it is detected that the system status is idle, if the current virus scanning does not begin, it is necessary to first acquire a scanning progress of previous virus scanning for use in the current virus scanning According to the tree structure above, the scanning progress records attributes of all enumerated or scanned directories and files during each time of scanning, and thus the scanning progress (for example, scanned files recorded therein) can be understood as the location of the file finally scanned in the scan queue when the scanning ends.

Step 206: Perform depth-first traversal on the tree structure, and check whether a node has not been scanned or enumerated following the node corresponding to the scanning progress in the tree structure.

As the scanning status and the scanning progress are recorded after scanning ends each time, that is, the tree structure upon completion of each time of scanning is saved, at the beginning of next scanning, it is necessary to first read content of the tree structure.

After reading, perform depth-first traversal on the tree structure, find the node corresponding to a file in the tree structure according to the file corresponding to the ending position in the previous scanning, and check whether there is a node for which scanning or enumeration is unfinished following the node in the tree structure. Herein, whether scanning or enumeration of the node is finished can be determined according to attributes of the node.

Figure 3:
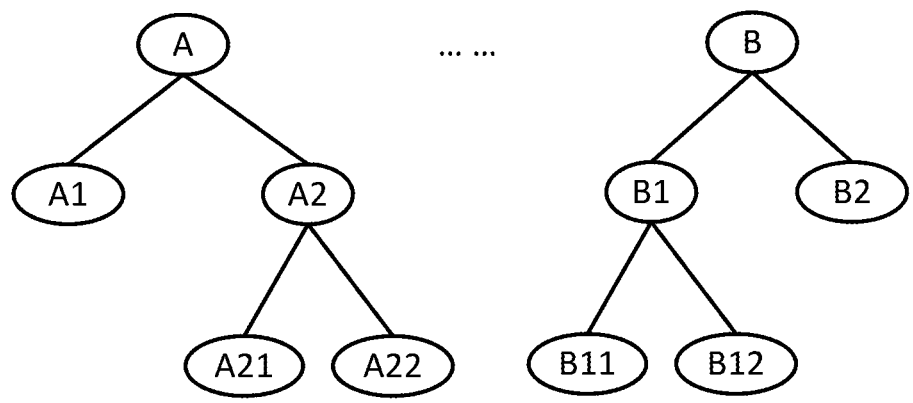
FIG. 3 is a schematic view of a tree structure according to the second embodiment of the present invention.

Referring to FIG. 3, Node A and Node B in FIG. 3 represent Partition A and Partition B, respectively, in which Partition A contains File A1 and Directory A2, and Directory A2 contains File A21 and File A22. Partition B contains Directory B1 and File B2, and Directory B1 contains File B11 and File B12. If the ending position of the previous scanning is File A21, it can be determined according to the attribute of Node A2 at this time that Directory A2 still has files or directories that have yet not been scanned, and of course, whether enumeration thereof is finished also can be determined according to attributes of Node B1 and Node B2.

As depth-first traversal can be understood and implemented by persons of ordinary skill in the art, it is not repeated herein.

Step 207: If a node has not been scanned, determine whether the node is the node where files are located, if yes, add the node to the scan queue, and otherwise, continue depth-first traversal of all sub-nodes of the node.

The scan queue is a scan queue recorded after the previous scanning ends, and due to constant enumeration and scanning during the scanning, newly-enumerated files also is constantly added to the scan queue.

Still referring to FIG. 3, if the scan queue at this time only contains File A1 and File A21 arranged sequentially, it is necessary to add File A22 behind File A21 in the scan queue. During the subsequent check and enumeration, it is also likely to sequentially add File B11, File B12, and File B2 behind A21 in the scan queue.

Step 208: If a node has not been enumerated, enumerate a node where the directory is located, add files enumerated under the node where the directory is located to the scan queue, add sub-directories enumerated under the node where the directory is located to the tree structure, then recursively traverse the node where the directory is located, and after enumeration of the node where the directory is located is finished, label the node where the directory is located as ENUMERATION FINISHED.

That is to say, if a node has not been enumerated, it indicates the node is a node where a directory is located, and it is necessary at this time to enumerate a node where the directory is located, add files under the node where the directory is located to the scan queue, add sub-directories enumerated under the node where the directory is located to the tree structure, continue enumerating the sub-directories, and continue processing the sub-directories in the way the node where the directory is located is processed. Through recursive traversal of the node where the directory is located, the node where the directory is located is labeled as ENUMERATION FINISHED after enumeration of the node where the directory is located is finished.

The recursive traversal herein is as follows: in the specific implementation, a function is first defined for a directory, in which the function can implement: add files under the directory to the scan queue, and add sub-directories enumerated under the node where the directory is located to the tree structure; and then all the sub-directories under the directory call the function to implement enumeration for the directory.

As recursive traversal can be understood and implemented by persons of ordinary skill in the art and does not serve as an invention point of the present invention, it is not repeated herein.

Step 209: Scan files in the scan queue according to the scanning progress.

In actual applications, during file canning, in order to ensure a lowest scanning speed, a file can be divided into several units. When each unit is scanned, first determine the system status, scan the unit if the system is idle, and upon completion of scanning of the unit, perform scanning on a next unit. If the system status is busy, wait a period of time and then continue determining the system status, if the system is busy, continue waiting, and if the system is still busy after the system waits a first predetermined time, exit scanning of the unit, and perform scanning of a next unit.

During the scanning, it is necessary to constantly set attributes of files or directories, for example, after scanning of one file is finished, search for a node where the file is located in the tree structure, and set an attribute of the node where the file is located as SCANNING FINISHED, and after scanning of all files and sub-directories under one directory is finished, set an attribute of a node where the directory is located as SCANNING FINISHED.

Step 210: Record a scanning progress of the current virus scanning.

As attributes of each node in the tree structure is set and labeled in the process of enumeration and scanning, attributes of each directory enumerated or traversed during the current virus scanning and whether the directory has been scanned can be recorded according to the tree structure upon ending of the scanning, attributes of each file enumerated or traversed during the current virus scanning and whether the file has been scanned can be recorded, whether the scanned file is a risk file can be recorded, and when the file is a risk file, a risk name and a hash value of the file are recorded.

In actual applications, as more and more files and directories are enumerated, the tree structure also becomes larger and larger, and larger memory is occupied. Thus, in order to reduce occupancy of the memory, it is common to delete all files and sub-directories under the node where the directory is located labeled as SCANNING FINISHED.

In conclusion, the method for virus scanning according to the second embodiment of the present invention can adjust a scanning progress according to the system status, and can continue virus scanning from the previous scanning progress, thereby reducing the virus scanning time significantly while improving the user experience.

Third Embodiment

Figure 4:
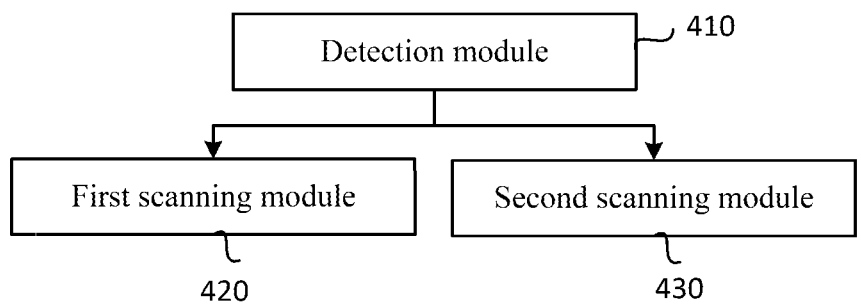
FIG. 4 is a schematic structural view of an apparatus for virus scanning according to a third embodiment of the present invention.

Referring to FIG. 4, an apparatus for virus scanning is schematically shown according to the third embodiment of the present invention. The apparatus for virus scanning is a program module in the foregoing system, or an apparatus capable of detecting the system status defined above and performing virus scanning and killing on files or directories in the terminal hard disk according to the status thereof. The apparatus includes: a detection module 410, a first scanning module 420, and a second scanning module 430.

The detection module 410 is configured to detect a status of a system.

The first scanning module 420 is configured to, when the detection module detects that the system status is idle, if current virus scanning has begun, continue the current virus scanning, and if the current virus scanning does not begin, acquire a scanning progress of previous virus scanning, begin the current virus scanning according to the scanning progress, and record a scanning progress of the current virus scanning The second scanning module 430 is configured to, when the detection module detects that the system status is busy, if the current virus scanning does not begin, wait for the current virus scanning, and if the current virus scanning has begun, reduce the speed of the current virus scanning, and when system statuses detected within a first predetermined time are all busy, stop the current virus scanning, and recording a scanning progress of the current virus scanning.

It should be noted that, the apparatus for virus scanning according to the embodiment, in virus scanning, is only illustrated by taking an example of the above division of the functional modules. In actual applications, the function assignment can be performed by different functional modules as required, that is, the internal structure of the apparatus is divided into different functional modules, so as to fulfill all or a part of the functions described above. In addition, the apparatus for virus scanning according to this embodiment is corresponding to the method for virus scanning according to the first embodiment. Please refer to the method embodiment for the specific implementation, which is not repeated herein.

In sum, the apparatus for virus scanning according to the third embodiment of the present invention can adjust a scanning progress according to the system status, and can continue virus scanning from the previous scanning progress, thereby reducing the virus scanning time significantly while improving the user experience.

Fourth Embodiment

Figure 5:
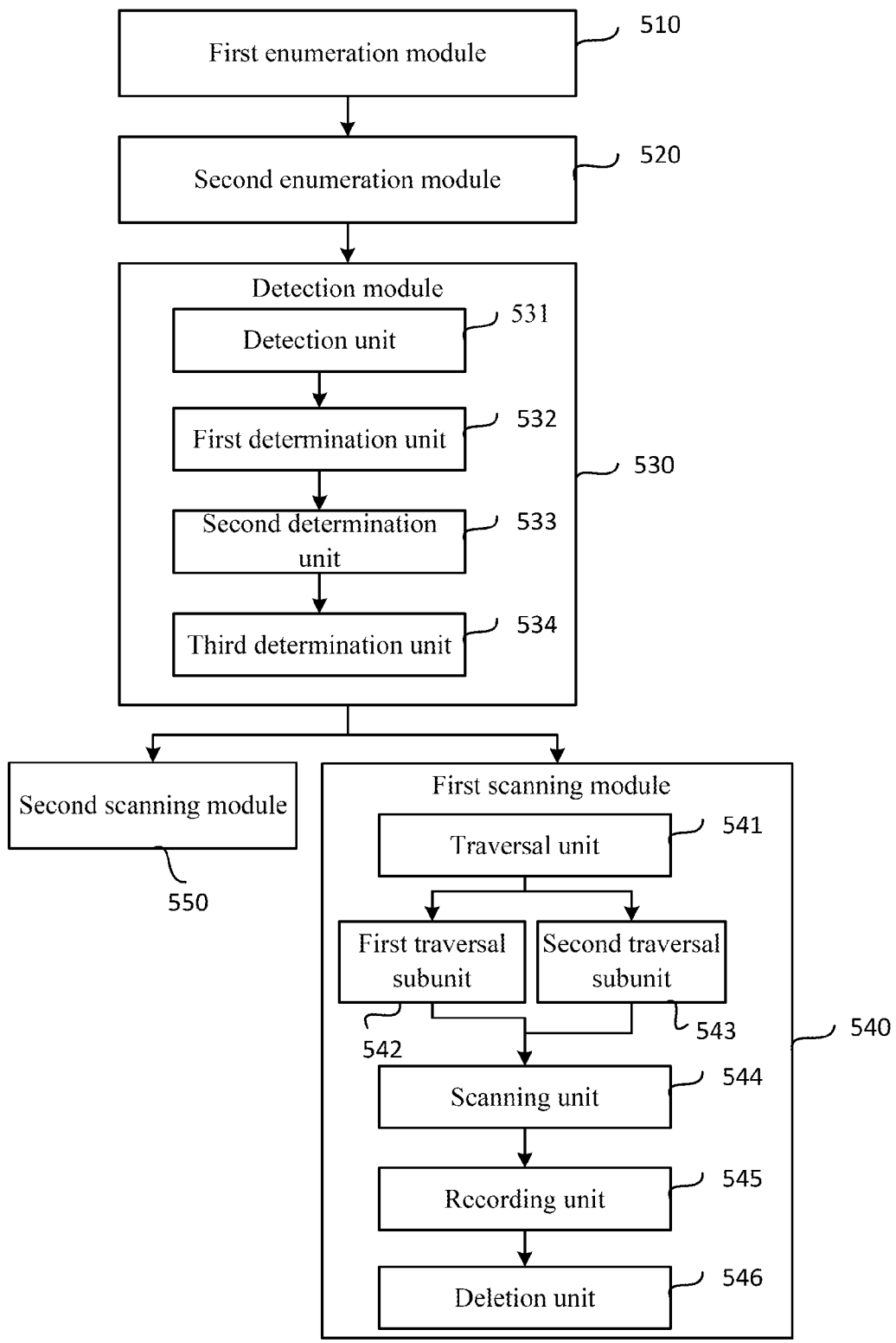
FIG. 5 is a schematic structural view of an apparatus for virus scanning according to a fourth embodiment of the present invention.

Referring to FIG. 5, an apparatus for virus scanning is schematically shown according to the fourth embodiment of the present invention. The apparatus for virus scanning is a program module in the foregoing system, or an apparatus capable of detecting the system status defined above and performing virus scanning and killing on files or directories in the terminal hard disk according to the status thereof. The apparatus includes: a first enumeration module 510, a second enumeration module 520, a detection module 530, a first scanning module 540, and a second scanning module 550.

The first enumeration module 510 is configured to enumerate all hard disk partitions, and add the hard disk partitions to a tree structure, in which attributes of each node of the tree structure include: whether it is a file, whether enumeration is finished, and whether scanning is finished.

The second enumeration module 520 is configured to enumerate all directories or files in each hard disk partition, add the directories or files in the partitions as nodes to the tree structure, set attributes of the nodes where the directories or files are located, and add the files to a scan queue.

The detection module 530 is configured to detect a status of the system.

The detection module 530 may include a detection unit 531, a first determination unit 532, a second determination unit 533, and a third determination unit 534.

The detection unit 531 is configured to detect whether it is in an input status or a full-screen status, and detecting current occupancy of system resources.

The first determination unit 532 is configured to determine, if the detection unit detects that it is in the input status or the full-screen status, that the detected system status is busy.

The second determination unit 533 is configured to determine, if the detection unit detects that it is not in the input status and the full-screen status, when the detected current occupancy of system resources is greater than predetermined occupancy, that the detected system status is busy.

The third determination unit 534 is configured to determine, if the detection unit detects that is not in the input status and the full-screen status, when the current occupancy of system resources detected within a second predetermined time is less than or equal to the predetermined occupancy, that the detected system status is idle.

The first scanning module 540 is configured to, when the detection module 530 detects that the system status is idle, if current virus scanning has begun, continue the current virus scanning, and if the current virus scanning does not begin, acquire a scanning progress of previous virus scanning, begin the current virus scanning according to the scanning progress, and record a scanning progress of the current virus scanning.

The first scanning module 540 may include a traversal unit 541, a first traversal subunit 542, a second traversal subunit 543, and a scanning unit 544.

The traversal unit 541 is configured to perform depth-first traversal on the tree structure, and checking whether a node has not been scanned or enumerated following the node corresponding to the scanning progress in the tree structure.

The first traversal subunit 542 is configured to determine, when the traversal unit detects that a node has not been scanned, whether the node is the node where files are located, if yes, add the node to the scan queue, and otherwise, continue depth-first traversal of all sub-nodes of the node.

The second traversal subunit 543 is configured to enumerate, when the traversal unit detects that a node has not been enumerated, the node where the directory is located, add files enumerated under the node where the directory is located to the scan queue, add sub-directories enumerated under the node where the directory is located to the tree structure, then recursively traversing the node where the directory is located, and after enumeration of the node where the directory is located is finished, label the node where the directory is located as ENUMERATION FINISHED.

The scanning unit 544 is configured to scan files in the scan queue according to the scanning progress.

In addition, the first scanning module 540 may further include a recording unit 545 and a deletion unit 546.

The recording unit 545 is configured to, upon ending of the current virus scanning, according to the tree structure, record attributes of each directory enumerated or traversed during the current virus scanning and whether the directory has been scanned, record attributes of each file enumerated or traversed during the current virus scanning and whether the file has been scanned, record whether the scanned file is a risk file, and when the file is a risk file, recording a risk name and a hash value of the file.

The deletion unit 546 is configured to deleting all files and sub-directories under the node where the directory is located labeled as SCANNING FINISHED.

The second scanning module 550 is configured to, when the detection module 530 detects that the system status is busy, if the current virus scanning does not begin, wait for the current virus scanning, and if the current virus scanning has begun, reduce the speed of the current virus scanning, and when system statuses detected within a first predetermined time are all busy, stop the current virus scanning, and record a scanning progress of the current virus scanning It should be noted that, the apparatus for virus scanning according to this embodiment, in virus scanning, is only illustrated by taking an example of the above division of the functional modules. In actual applications, the function assignment can be performed by different functional modules as required, that is, the internal structure of the apparatus is divided into different functional modules, so as to fulfill all or a part of the functions described above. In addition, the apparatus for virus scanning according to this embodiment is corresponding to the method for virus scanning according to the second embodiment. Please refer to the method embodiment for the specific implementation, which is not repeated herein.

In brief, the apparatus for virus scanning according to the fourth embodiment of the present invention can adjust a scanning progress according to the system status, and can continue virus scanning from the previous scanning progress, thereby reducing the virus scanning time significantly while improving the user experience.

The sequence numbers of the above embodiments of the present invention are merely for the convenience of description, and do not imply the preference among the embodiments.

It should be noted that all or a part of the steps according to the embodiments of the present invention is implemented by hardware or a program instructing relevant hardware. Yet another aspect of the invention provides a non-transitory computer readable storage medium which stores computer executable instructions or program codes. The computer executable instructions or program codes enable a computer or a similar computing apparatus to complete various operations in the method for virus scanning. The storage medium includes, but not limited to, a magnetic disk, an optical disk, a read-only memory (ROM), a random access memory (RAM), random memory (RAM), flash dive, or the likes.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for virus scanning, comprising:
   detecting a status of a system; and
   when the status of the system is idle, if current virus scanning has begun, continuing the current virus scanning, and if the current virus scanning has not begin, acquiring a scanning progress of previous virus scanning, beginning the current virus scanning according to the acquired scanning progress, and recording a scanning progress of the current virus scanning,
   wherein the step of detecting the status of the system comprises:
   detecting whether the system is in an input status or a full-screen status, and detecting a current occupancy of system resources;
   determining, if the system is in the input status or the full-screen status, that the detected status of the system is busy;
   determining, if the system is not in the input status and the full-screen status, when the detected current occupancy of the system resources is greater than a predetermined occupancy, that the detected status of the system is busy; and
   determining, if the system is not in the input status and the full-screen status, when the current occupancy of the system resources detected within a second predetermined time is less than or equal to the predetermined occupancy, that the detected system status is idle.

2. The method according to claim 1, before the step of detecting the status of the system, further comprising:
   enumerating all hard disk partitions, and adding the hard disk partitions to a tree structure, wherein attributes of each node of the tree structure comprise: whether it is a file, whether enumeration is finished, and whether scanning is finished; and
   enumerating all directories or files in each hard disk partition, adding the directories or files in the hard disk partitions as nodes to the tree structure, setting attributes of the nodes where the directories or files are located, and adding the files to a scan queue.

3. The method according to claim 2, wherein the step of setting attributes of the nodes where the directories or files are located comprises:
   when enumerating one directory, if enumeration is finished, setting an attribute of a node where the directory is located as ENUMERATION FINISHED, and if the enumeration is unfinished, setting the attribute of the node where the directory is located as ENUMERATION UNFINISHED;
   when scanning files or sub-directories under one directory, if scanning of all files and sub-directories under the directory is finished, setting an attribute of a node where the directory is located as SCANNING FINISHED, and if the scanning of all the files or sub-directories under the directory is unfinished, setting the attribute of the node where the directory is located as SCANNING UNFINISHED; and
   when scanning one file, if scanning of the file is finished, setting an attribute of a node where the file is located as SCANNING FINISHED, and if the scanning of the file is unfinished, setting the attribute of the node where the file is located as SCANNING UNFINISHED.

4. The method according to claim 3, wherein the step of beginning the current virus scanning according to the scanning progress comprises:
   performing depth-first traversal on the tree structure, and checking whether a node has not been scanned or enumerated following the node corresponding to the scanning progress in the tree structure;
   if a node has not been scanned, determining whether the node is the node where files are located, if yes, adding the node to the scan queue, and otherwise, continuing depth-first traversal of all sub-nodes of the node;
   if a node has not been enumerated, enumerating a node where the directory is located, adding files enumerated under the node where the directory is located to the scan queue, adding sub-directories enumerated under the node where the directory is located to the tree structure, then recursively traversing the node where the directory is located, and after enumeration of the node where the directory is located is finished, labeling the node where the directory is located as ENUMERATION FINISHED; and
   scanning files in the scan queue according to the scanning progress;
   wherein, after scanning of one file is finished, searching for a node where the file is located in the tree structure, setting an attribute of the node where the file is located as SCANNING FINISHED, and after scanning of all files and sub-directories under one directory is finished, setting an attribute of a node where the directory is located as SCANNING FINISHED.

5. The method according to claim 4, wherein the step of recording a scanning progress of the current virus scanning comprises:
   upon ending of the current virus scanning, according to the tree structure, recording attributes of each directory enumerated or traversed during the current virus scanning and whether the directory has been scanned, recording attributes of each file enumerated or traversed during the current virus scanning and whether the file has been scanned, recording whether the scanned file is a risk file, and when the file is a risk file, recording a risk name and a hash value of the file.

6. The method according to claim 4, after the step of beginning the current virus scanning according to the scanning progress, further comprising:
   deleting all files and sub-directories under the node where the directory is located labeled as SCANNING FINISHED.

7. The method according to claim 1, after the step of detecting the status of the system, further comprising:
   when the system status is busy, if the current virus scanning does not begin, waiting for the current virus scanning, and if the current virus scanning has begun, reducing the speed of the current virus scanning, and when system statuses detected within a first predetermined time are all busy, stopping the current virus scanning, and recording a scanning progress of the current virus scanning.

8. An apparatus for virus scanning, comprising:
   a detection module configured to detect a status of a system; and
   a first scanning module configured to, when the detection module detects that the status of the system is idle, if current virus scanning has begun, continue the current virus scanning, and if the current virus scanning does not begin, acquire a scanning progress of previous virus scanning, begin the current virus scanning according to the scanning progress, and record a scanning progress of the current virus scanning, wherein the detection module comprises:

a detection unit configured to detect whether it is in an input status or a full-screen status, and detect current occupancy of system resources;

a first determination unit configured to determine, if the detection unit detects that the system is in the input status or the full-screen status, that the detected status of the system is busy;

a second determination unit configured to determine, if the detection unit detects that the system is not in the input status and the full-screen status, when the detected current occupancy of system resources is greater than predetermined occupancy, that the detected system status is busy; and a third determination unit configured to determine, if the detection unit detects that the system is not in the input status and the full-screen status, when the current occupancy of system resources detected within a second predetermined time is less than or equal to the predetermined occupancy, that the detected system status is idle.

9. The apparatus according to claim 8, further comprising:

a first enumeration module configured to enumerate all hard disk partitions, and adding the hard disk partitions to a tree structure, wherein attributes of each node of the tree structure comprise: whether it is a file, whether enumeration is finished, and whether scanning is finished; and a second enumeration module configured to enumerate all directories or files in each hard disk partition, add the directories or files in the hard disk partitions as nodes to the tree structure, set attributes of the nodes where the directories or files are located, and adding the files to a scan queue.

10. The apparatus according to claim 9, wherein the second enumeration module is further configured to:

when enumerating one directory, if enumeration is finished, set an attribute of a node where the directory is located as ENUMERATION FINISHED, and if the enumeration is unfinished, set the attribute of the node where the directory is located as ENUMERATION UNFINISHED;

when scanning files or sub-directories under one directory, if scanning of all files and sub-directories under the directory is finished, set an attribute of a node where the directory is located as SCANNING FINISHED, and if the scanning of all the files or sub-directories under the directory is unfinished, set the attribute of the node where the directory is located as SCANNING UNFINISHED; and when scanning one file, if scanning of the file is finished, set an attribute of a node where the file is located as SCANNING FINISHED, and if the scanning of the file is unfinished, set the attribute of the node where the file is located as SCANNING UNFINISHED.

11. The apparatus according to claim 10, wherein the first scanning module comprises:

a traversal unit configured to perform depth-first traversal on the tree structure, and check whether a node has not been scanned or enumerated following the node corresponding to the scanning progress in the tree structure;

a first traversal subunit configured to determine, when the traversal unit detects that a node has not been scanned, whether the node is the node where files are located, if yes, add the node to the scan queue, and otherwise, continue depth-first traversal of all sub-nodes of the node;

a second traversal subunit configured to, when the traversal unit detects that a node has not been enumerated, enumerate a node where the directory is located, add files enumerated under the node where the directory is located to the scan queue, add sub-directories enumerated under the node where the directory is located to the tree structure, then recursively traverse the node where the directory is located, and after enumeration of the node where the directory is located is finished, label the node where the directory is located as ENUMERATION FINISHED; and a scanning unit configured to scan files in the scan queue according to the scanning progress;

wherein, after scanning of one file is finished, search for a node where the file is located in the tree structure, set an attribute of the node where the file is located as SCANNING FINISHED, and after scanning of all files and sub-directories under one directory is finished, set an attribute of a node where the directory is located as SCANNING FINISHED.

12. The apparatus according to claim 11, wherein the first scanning module further comprises:

a recording unit configured to, upon ending of the current virus scanning, according to the tree structure, record attributes of each directory enumerated or traversed during the current virus scanning and whether the directory has been scanned, record attributes of each file enumerated or traversed during the current virus scanning and whether the file has been scanned, record whether the scanned file is a risk file, and when the file is a risk file, record a risk name and a hash value of the file.

13. The apparatus according to claim 11, wherein the first scanning module further comprises:

a deletion unit configured to delete all files and sub-directories under the node where the directory is located labeled as SCANNING FINISHED.

14. The apparatus according to claim 8, further comprising:

a second scanning module configured to, when the detection module detects that the status of the system is busy, if the current virus scanning does not begin, wait for the current virus scanning, and if the current virus scanning has begun, reduce the speed of the current virus scanning, and when system statuses detected within a first predetermined time are all busy, stop the current virus scanning, and record a scanning progress of the current virus scanning.

15. A non-transitory computer-readable medium storing instructions which, when executed by one or more processors, cause an apparatus to perform a method for virus scanning, the method comprising:

detecting a status of a system; and when the status of the system is idle, if current virus scanning has begun, continuing the current virus scanning, and if the current virus scanning has not begun, acquiring a scanning progress of previous virus scanning, beginning the current virus scanning according to the acquired scanning progress, and recording a scanning progress of the current virus scanning, wherein the step of detecting the status of the system comprises:

detecting whether the system is in an input status or a full-screen status, and detecting a current occupancy of system resources;

determining, if the system is in the input status or the full-screen status, that the detected status of the system is busy;

determining, if the system is not in the input status and the full-screen status, when the detected current occupancy of the system resources is greater than a predetermined occupancy, that the detected status of the system is busy; and determining, if the system is not in the input status and the full-screen status, when the current occupancy of the system resources detected within a second predetermined time is less than or equal to the predetermined occupancy, that the detected system status is idle.

16. The non-transitory computer-readable medium according to claim 15, wherein the method, before the step of detecting the status of the system, further comprises:

enumerating all hard disk partitions, and adding the hard disk partitions to a tree structure, wherein attributes of each node of the tree structure comprise: whether it is a file, whether enumeration is finished, and whether scanning is finished; and enumerating all directories or files in each hard disk partition, adding the directories or files in the hard disk partitions as nodes to the tree structure, setting attributes of the nodes where the directories or files are located, and adding the files to a scan queue.

17. The non-transitory computer-readable medium according to claim 16, wherein the step of setting attributes of the nodes where the directories or files are located comprises:

when enumerating one directory, if enumeration is finished, setting an attribute of a node where the directory is located as ENUMERATION FINISHED, and if the enumeration is unfinished, setting the attribute of the node where the directory is located as ENUMERATION UNFINISHED;

when scanning files or sub-directories under one directory, if scanning of all files and sub-directories under the directory is finished, setting an attribute of a node where the directory is located as SCANNING FINISHED, and if the scanning of all the files or sub-directories under the directory is unfinished, setting the attribute of the node where the directory is located as SCANNING UNFINISHED; and when scanning one file, if scanning of the file is finished, setting an attribute of a node where the file is located as SCANNING FINISHED, and if the scanning of the file is unfinished, setting the attribute of the node where the file is located as SCANNING UNFINISHED.

18. The non-transitory computer-readable medium according to claim 17, wherein the step of beginning the current virus scanning according to the scanning progress comprises:

performing depth-first traversal on the tree structure, and checking whether a node has not been scanned or enumerated following the node corresponding to the scanning progress in the tree structure;

if a node has not been scanned, determining whether the node is the node where files are located, if yes, adding the node to the scan queue, and otherwise, continuing depth-first traversal of all sub-nodes of the node;

if a node has not been enumerated, enumerating a node where the directory is located, adding files enumerated under the node where the directory is located to the scan queue, adding sub-directories enumerated under the node where the directory is located to the tree structure, then recursively traversing the node where the directory is located, and after enumeration of the node where the directory is located is finished, labeling the node where the directory is located as ENUMERATION FINISHED; and scanning files in the scan queue according to the scanning progress;

wherein, after scanning of one file is finished, searching for a node where the file is located in the tree structure, setting an attribute of the node where the file is located as SCANNING FINISHED, and after scanning of all files and sub-directories under one directory is finished, setting an attribute of a node where the directory is located as SCANNING FINISHED.

19. The non-transitory computer-readable medium according to claim 18, wherein the step of recording a scanning progress of the current virus scanning comprises:

upon ending of the current virus scanning, according to the tree structure, recording attributes of each directory enumerated or traversed during the current virus scanning and whether the directory has been scanned, recording attributes of each file enumerated or traversed during the current virus scanning and whether the file has been scanned, recording whether the scanned file is a risk file, and when the file is a risk file, recording a risk name and a hash value of the file.

20. The non-transitory computer-readable medium according to claim 18, wherein the method, after the step of beginning the current virus scanning according to the scanning progress, further comprises:

deleting all files and sub-directories under the node where the directory is located labeled as SCANNING FINISHED.

21. The non-transitory computer-readable medium according to claim 15, wherein the method, after the step of detecting the status of the system, further comprises:

when the system status is busy, if the current virus scanning does not begin, waiting for the current virus scanning, and if the current virus scanning has begun, reducing the speed of the current virus scanning, and when system statuses detected within a first predetermined time are all busy, stopping the current virus scanning, and recording a scanning progress of the current virus scanning.

* * * * *